US006358579B1

(12) United States Patent
Peiffer et al.

(10) Patent No.: US 6,358,579 B1
(45) Date of Patent: Mar. 19, 2002

(54) MULTIPLE-PACK SYSTEM COMPRISING A SEALABLE POLYESTER FILM

(75) Inventors: Herbert Peiffer, Mainz; Guenther Crass, Taunusstein/Wehen; Ursula Murschall, Nierstein, all of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/577,947

(22) Filed: May 25, 2000

(30) Foreign Application Priority Data

May 26, 1999 (DE) .......................... 199 23 839

(51) Int. Cl.[7] .................. B32B 27/08; B32B 27/32; B32B 27/36; B65D 65/40; B65D 71/06
(52) U.S. Cl. .................. 428/35.7; 428/216; 428/335; 428/346; 428/347; 428/349; 428/355 R; 428/480; 428/483; 528/302; 528/305; 528/308; 528/308.6
(58) Field of Search .................. 428/212, 213, 428/215, 216, 332, 335, 336, 339, 346, 347, 349, 355 R, 480, 483, 35.7; 528/302, 305, 308, 308.6; 206/242, 390, 597

(56) References Cited

U.S. PATENT DOCUMENTS

| 3,666,836 A | 5/1972 | John |
| 4,294,058 A | 10/1981 | Rensner |
| 4,303,708 A | 12/1981 | Gebhardt et al. |
| 4,375,494 A | * 3/1983 | Stokes ........................ 428/323 |
| 4,765,999 A | * 8/1988 | Winter ........................ 426/113 |
| 5,059,470 A | * 10/1991 | Fukuda et al. .............. 428/142 |
| 5,310,787 A | * 5/1994 | Kutsuwa et al. ............ 524/513 |
| 5,329,747 A | 7/1994 | Williams, Jr. |
| 5,955,181 A | * 9/1999 | Peiffer et al. ................ 428/212 |

FOREIGN PATENT DOCUMENTS

| DE | 25 49 243 A1 | * 5/1977 |
| DE | 36 35 928 A1 | 4/1988 |
| EP | 0 065 367 A1 | 11/1982 |
| EP | 0 077 302 A1 | * 4/1983 |
| EP | 0 602 964 A1 | 6/1994 |
| EP | 0 717 712 B1 | * 6/1997 |
| EP | EP 0 945 258 | 9/1999 |
| GB | 1 401 880 | 12/1972 |
| JP | 11-077884 A | * 3/1999 |

* cited by examiner

Primary Examiner—Vivian Chen
(74) Attorney, Agent, or Firm—Finnegan, Henderson, Farabow, Garrett, & Dunner, L.L.P.

(57) ABSTRACT

A multiple-pack system composed of a combined pack made from individual packages, where the individual packaging takes place in a biaxially stretch-oriented polypropylene film with modified polyolefinic sealable layers. The characterizing features of the multiple-pack system are that the combined-pack film is composed of a sealable, biaxially stretch-oriented coextruded polyester film having more than one layer, where the sealable outer layer(s) comprise(s) copolyester. In the novel multiple-packed system, the combined-pack film is sealable with itself, but does not seal to the biaxially oriented polypropylene films of the individual packages.

7 Claims, No Drawings

MULTIPLE-PACK SYSTEM COMPRISING A SEALABLE POLYESTER FILM

FIELD OF THE INVENTION

The invention relates to a multiple-pack system, composed of a combined pack made from individual packages, where the individual packaging takes place in a biaxially stretch-oriented polypropylene film with modified polyolefinic outer layers and the combined-pack film is composed of a sealable polyester film with sealable layers based on polyester copolymers.

DESCRIPTION OF THE RELATED ART

Individual packages are generally brought together to form combined multiple packs. A known example of this is the packaging of blocks of cigarette packets.

The film usually used for wrapping cigarette packets has predominantly polyolefinic outer layers (sealable layers), but these seal undesirably to any combined-pack wrap made from a plastic which is also sealable. Besides the polyolefinic outer layers, therefore, sealable layers made from PVDC or from (poly)acrylates have been used for plastic films in the application sector described. Although these plastic films have had better usability overall for multiple-packaging systems, their relatively high price has prevented them from achieving importance in the market.

DE-A-3 635 928 describes a multiple-pack system composed of a combined pack made from individual packages, where the individual packaging takes place in a biaxially stretch-oriented polypropylene film with modified polyolefinic sealable layers. The characterizing features of the multiple-pack system are that the combined-pack film is composed of a sealable, biaxially stretch-oriented coextruded polypropylene film having a symmetrical structure and more than one layer, where the outer layers comprise a low-molecular-weight hydrocarbon resin as additive and have been corona-treated. However, the film for the combined pack has the technical disadvantage of a relatively high sealing temperature when compared with PVDC-coated or acrylate-coated films. If this temperature is applied to the combined-pack film this shrinks, as does the film for the individual packaging. This results in creases in both films, and these which have an adverse effect on the appearance of the packaging.

When blocks of cigarette packets are packaged it has therefore been necessary to continue using paper wrapping, and it has been possible to use film only for the cigarette-packet wrap for the individual pack.

Experiments have also been carried out in rendering the base layer of a plastic film sealable by incorporating certain hydrocarbon resins, as an alternative to the sealable materials in specific sealable layers.

DE-C-2 045 115 obtains a hot-sealable monofilm starting from a stereoregular polypropylene by adding from 5 to 40% by weight of at least one 50%-hydrogenated vinylaromatic hydrocarbon resin, in particular a styrene resin, with a molecular weight of more than 500 and a drop softening point of from 70 to 170° C.

DE-A-0 065 367 describes polypropylene films which comprise a low-density polyethylene, besides the components present previously in DE-C-2 045 115. This specific composition is said to improve the extrudability of the polypropylene film.

DE-A-2 362 049 describes a transparent, self-sealable film which is composed of from 90 to 99.95% by weight of a copolymer of ethylene and vinyl ester or a hydrocarbyl-substituted vinyl ester and from 0.05 to 10% by weight of a hydrocarbon resin, also combined with from 0.05 to 5% by weight of polyisobutylene or polybutylene, in order to give the film high tackiness and exceptional elasticity.

Especially the polyolefinic raw materials in the sealable layer of the self-supporting polypropylene films, but also the self-sealing polypropylene films, have excellent bonding properties. However, packaging films intended for the multiple-packaging system are to have adequate sealability to themselves on the one hand but on the other hand are not to seal to the packaging films of the individual packages present within the combined pack. Such films known hitherto do not meet this very important requirement, or meet it only at very high cost.

SUMMARY OF THE INVENTION

It was therefore an object of the present invention to develop a multiple-pack system for combined-pack packaging, where the combined-pack film in the multiple-pack system does not seal to the film of the individual package.

This object is achieved via a multiple-pack system composed of a combined pack made from individual packages, where the individual packaging takes place in a biaxially stretch-oriented polypropylene film with modified polyolefinic sealable layers. The characterizing features of the multiple-pack system are that the combined-pack film is composed of a sealable, biaxially stretch-oriented coextruded polyester film whose structure may or may not be symmetrical and which has more than one layer, where the structure(s) of the sealable layer(s) has/have been based on modified polyester copolymers.

DETAILED DESCRIPTION OF THE INVENTION

According to the invention, the combined-pack film has at least two layers, and its layers are then a base layer B and the sealable outer layer A. In a preferred embodiment, the combined-pack film has sealable outer layers A and C on both sides of its base layer B.

The base layer B of the film is preferably composed of at least 90% by weight of a thermoplastic polyester. Polyesters suitable here are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclo-hexane and terephthalic acid (=poly-1,4-cyclohexane-dimethylene terephthalate, PCDT) or else made from ethylene glycol, naphthalene-2,6-dicarboxylic acid and biphenyl-4,4'-dicarboxylic acid (=polyethylene 2,6-naphthalate bibenzoate, PENBB). Preference is given to polyesters composed of at least 90 mol %, particularly preferably at least 95 mol %, of ethylene glycol units and terephthalic acid units or ethylene glycol units and napthalene-2,6-dicarboxylic acid units. The remaining monomer units are derived from other aliphatic, cycloaliphatic or aromatic diols and, respectively, dicarboxylic acids, as may also be present in layer A (or in layer C).

Examples of other suitable aliphatic diols are diethylene glycol, triethylene glycol, aliphatic glycols of the general formula HO—$(CH_2)_n$—OH, where n is an integer from 3 to 6 (in particular 1,3-propanediol, 1,4-butanediol, 1,5-pentanediol and 1,6-hexanediol) or branched aliphatic glycols having up to 6 carbon atoms. Among the cycloaliphatic diols, mention should be made of cyclohexanediols (in particular 1,4-cyclo-hexanediol). Examples of other suitable aromatic diols are HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also highly suitable.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids, mention should be made of cyclohexanedicarboxylic acids (in particular cyclohexane-1,4-dicarboxylic acid). Among the aliphatic dicarboxylic acids, the ($C_3$–$C_{19}$) alkanedioic acids are particularly suitable, where the alkane moiety may be straight-chain or branched.

The polyesters may, for example, be prepared by the transesterification process. The starting materials here are dicarboxylic esters and diols, and these are reacted using the usual transesterification catalysts, such as salts of zinc, of calcium, of lithium, of magnesium or of manganese. The intermediates are then polycondensed in the presence of typical polycondensation catalysts, such as antimony trioxide or titanium salts. They may equally well be prepared by direct esterification in the presence of polycondensation catalysts, starting directly from the dicarboxylic acids and the diols.

The structure of the sealable outer layer(s) A (and C) applied by coextrusion to the base layer (B) is based on polyester copolymers.

According to the invention, two different makeups are possible for the outer-layer copolyesters:

i) Copolyester containing ethylene 2,6-naphthalate units and ethylene terephthalte units The sealable outer layer(s) of the combined-pack film according to the invention is/are composed of copolymers which contain ethylene 2,6-naphthalate units and ethylene terephthalate units. Up to 10 mol % of the copolymers may be composed of other comonomers (see above). The weight ratio of the ethylene 2,6-naphthalate units to the ethylene terephthalate units is from 5:95 to 95:5, preferably from 10:90 to 90:10, very particularly preferably from 15:85 to 85:15.

ii) Copolyester containing ethylene isophthalate units and ethylene terephthalate units The sealable outer layer(s) of the combined-pack film according to the invention are copolyesters made up predominantly of terephthalic acid units, isophthalic acid units and ethylene glycol units. The other monomer units come from other aliphatic, cycloaliphatic or aromatic diols and, respectively, dicarboxylic acids, as may also be present in the base layer (see above). The preferred copolyesters which provide the desired sealing properties are those whose structure is composed of ethylene terephthalate units and ethylene isophthalate units and of ethylene glycol units. The preferred proportion of ethylene terephthalate is from 40 to 95 mol % and the corresponding proportion of ethylene isophthalate is from 60 to 5 mol %. Particular preference is given to copolyesters in which the proportion of the ethylene terephthalate is from 50 to 90 mol % and the proportion of ethylene isophthalate is correspondingly from 50 to 10 mol %.

For the other layer (outer layer C) or for any intermediate layers which may be present, use may in principle be made of the same polymers as described above for the base layer B and the layer A.

The base layer and the other layer(s) may additionally comprise conventional additives, such as stabilizers and/or antiblocking agents. They are usefully added to the polymer or, respectively, to the polymer mixture, prior to melting. Examples of stabilizers used are phosphorus compounds, such as phosphoric acid or phosphoric esters.

Typical antiblocking agents (also termed pigments in this context) are inorganic and/or organic particles, such as calcium carbonate, amorphous silica, talc, magnesium carbonate, barium carbonate, calcium sulfate, barium sulfate, lithium fluoride, calcium phosphate, magnesium phosphate, aluminum oxide, lithium fluoride, or the calcium, barium, zinc or manganese salts of the dicarboxylic acids used, or carbon black, titanium dioxide or kaolin, or organic particles, such as crosslinked polystyrene particles or crosslinked acrylate particles.

The antiblocking agents selected may also be mixtures of two or more different antiblocking agents or mixtures of antiblocking agents of the same makeup but different particle size. The particles may be added to the individual layers of the film in the respective advantageous concentrations, e.g. as a glycolic dispersion during the polycondensation, or via masterbatches during extrusion. Pigment concentrations which have proven particularly suitable are from 0 to 5% by weight. EP-A-0 602 964, for example, describes in detail the antiblocking agents used.

The pigmentation of the individual layers may thus vary greatly and depends essentially on the film structure (layer structure) and on the requirements placed upon the film in relation to achieving physical properties (haze, gloss), and also on the behavior during production and processing.

If, for example, the film is the preferred three-layer film with the base layer B and the two outer layers A and C, the particle concentration in the base layer B is preferably lower than in the two outer layers A and C. In a three-layer film of this type the particle concentration in the base layer B is from 0 to 0.08% by weight, preferably from 0 to 0.06% by weight and in particular from 0 to 0.04% by weight. The particle diameter of the particles used is in principle not subject to any limit, but particular preference is given to particles with an average diameter greater than 0.1 μm.

The polyester film for the combined pack has a three-layer structure in the particularly preferred embodiment. The two layers A and C then form the outer layers A and C. The structure, thickness and makeup of the two outer layers A and C may be selected independently. In an advantageous usage form, the structure of the film is symmetrical, i.e. the film has ABA structure. In another advantageous usage form, the second outer layer (e.g. the outer layer C) has more pigments (i.e. a higher pigment concentration) than the first outer layer A. The pigment concentration in this second outer layer is from 0.02 to 2.0%, advantageously from 0.025 to 1.5% and in particular from 0.03 to 1.0%. The other layer A opposite the outer layer C may have only a little, or no, inert pigments as fillers. The concentration of the inert particles in the layer A is then from 0 to 0.08% by weight, preferably from 0 to 0.065% by weight and in particular from 0 to 0.05% by weight.

There may, if desired, also be an intermediate layer between the base layer and the outer layer(s) of the combined-pack film. This may in turn be composed of the polymers described for the base layer or outer layers. In a particularly preferred embodiment, it is composed of the polyester used for the base layer. It may also comprise the conventional additives described. The thickness of the intermediate layer is generally greater than 0.3 μm and is preferably in the range from 0.5 to 15 μm, in particular in the range from 1.0 to 10 μm and very particularly preferably in the range from 1.0 to 5 μm.

In the particularly advantageous three-layer embodiment of the film according to the invention, the thickness of the outer layer(s) A (and C) is generally greater than 0.1 µm and is usually in the range from 0.2 to 3.0 µm, advantageously in the range from 0.2 to 2.5 µm, in particular in the range from 0.3 to 2 µm and very particularly preferably in the range from 0.3 to 1.5 µm. The thicknesses of the outer layers A and C may be identical or different.

The total thickness of the polyester film according to the invention may vary within certain boundaries. It is from 3 to 50 µm, in particular from 4 to 30 µm, preferably from 5 to 20 µm. The proportion of the total thickness made up by the layer B is preferably from 5 to 90%.

The polymers for the base layer B and the two outer layers A and C are fed to three extruders. Any foreign bodies or contamination present may be filtered out from the polymer melt prior to extrusion. The melts are then shaped in a coextrusion die to give flat melt films, and laid one on top of the other. The coextrusion film is then drawn off and solidified with the aid of a chill roll and, if desired, of other rolls.

The biaxial orientation procedure is generally carried out in sequence. For this, longitudinal orientation (i.e. in the machine direction) is preferably the first procedure, followed by transverse orientation (i.e. perpendicularly to the machine direction). The longitudinal orientation procedure preferably takes place with the aid of two rolls running at different speeds corresponding to the stretching ratio desired. For the transverse orientation procedure an appropriate tenter frame is generally utilized.

The temperature at which the orientation procedure is carried out may vary within a relatively wide range and depends on the film properties desired. The longitudinal stretching is generally carried out at from 80 to 140° C., and the transverse stretching at from 90 to 150° C. The longitudinal stretching ratio is generally within the range from 2.5:1 to 6:1. The transverse stretching ratio is generally within the range from 3.0:1 to 5.0:1.

In the heat-setting which follows, the film is held at a temperature of from 150 to 250° C. for from about 0.1 to 10 s. The film is then usually wound up.

To establish other desired properties, the film may also be chemically treated. Typical coatings have adhesion-promoting, antistatic, slip-improving or release action. It is clear that these additional coatings may be applied to the film by in-line coating using aqueous dispersions prior to the transverse orientation procedure.

Prior to being printed or having a metallic layer applied to one or both of its sides, the biaxially oriented and heat-set polyester film may be corona- or flame-treated. The intensity of treatment is selected so as to give the film a surface tension of generally above 45 mN/m.

The film for the individual packages is generally composed of biaxially oriented polypropylene. The sealable layers of the individual packaging films, which may be present on one or both sides, are preferably composed of an ethylene homopolymer (high-density polyethylene or low-density polyethylene), of a copolymer of propylene as principal component and ethylene, preferably in amounts of not more than 10% by weight (based on the copolymer), of a copolymer of propylene as principal component and 1-butene, preferably in amounts of from 10 to 15% by weight (based on the copolymer), of a terpolymer made from propylene, ethylene and an alpha-olefin having from 4 to 10 carbon atoms, preferably one made from 93.2 to 99.0% by weight of propylene, from 0.5 to 1.9% by weight of ethylene and from 0.5 to 4.9% by weight of an alpha-olefin having from 4 to 10 carbon atoms, or of a mixture of these polymers. The comonomers are essentially randomly distributed in the polymers (cf. DE-B-2 814 311). The thickness of the sealable layers is from about 0.1 to 10 µm, preferably from 0.4 to 2 µm.

It is a feature of the present invention that the combined-pack films produced in the manner described are not sealable to the films for the individual packages.

Another advantage of the combined-pack films according to the invention is that their sealable layer(s) was/were produced in one step (in-line) by applying coextrusion technology. They are therefore significantly lower in cost than the films coated "off-line" with acrylate or PVDC.

In summary, it may be said that the combined pack according to the invention features a combination of properties which could not be present together in a multiple pack. The combined-pack film features very good sealing performance with respect to itself very good processing performance very good optical properties and very good printability.

The table below (Table 1) gives again the most important film properties for the combined-pack film according to the invention.

TABLE 1

| | Range according to the invention | Preferred | Particularly preferred | Unit | Measurement method |
|---|---|---|---|---|---|
| Minimum sealing temperature | <130 | <125 | <120 | ° C. | see Description |
| Seal seam strength | >1 | >1.2 | >1.5 | N/15 mm | see Description |
| Gloss | >120 | >130 | >140 | | DIN 67 530 |
| Haze | <5 | <4 | <3 | % | ASTM-D 1003-52 |
| Coefficient of friction A/C | <0.6 | <0.55 | <0.50 | | DIN 53 375 |

The methods utilized to characterize the combined-pack film were as follows:

(1) Coefficient of friction

The coefficient of friction was determinded to DIN 53 375, 14 days after production.

(2) Haze

The haze of the film was measured to ASTM-D 1003-52. The Holz haze measurement was based on ASTM-D 1003-52 but in order to utilize the most effective measurement range, measurements were made on four pieces of film laid one on top of the other, and a 1° slip diaphragm was used instead of a 4° pinhole.

(3) Gloss

Gloss was determined to DIN 67 530. The reflectance was measured as a characteristic optical value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing the light beams hitting the photoelectronic detector. The value measured is dimensionless and must be stated together with the angle of incidence.

(4) Determination of the lowest sealing temperature (sealing initiation temperature)

Hot-sealed specimens (seal seam 20 mm×100 mm) were produced with a Brugger HSG/ET sealing apparatus, by sealing a film at different temperatures with the aid of two heated sealing jaws at a sealing pressure of 10

N/cm² and a sealing time of 0.5 s. From the sealed specimens, test strips of 15 mm width were cut. The T-seal seam strength was measured as in the determination of seal seam strength. The lowest sealing temperature is the temperature at which a seal seam strength of at least 0.5 N/15 mm is achieved.

(5) Seal seam strength

This was determined by placing two strips of film, 15 mm in width, one on top of the other and sealing these at 130° C. with a sealing time of 0.5 s and a sealing pressure of 1.5 N/mm² (apparatus: Brugger Model NDS, sealing jaw heated only on one side). The seal seam strength was determined using the T-peel method.

(6) Surface tension

Surface tension was determined by the ink method (DIN 53 364).

EXAMPLE 1

Chips made from polyethylene terephthalate (prepared by the transesterification process with Mn as trans-esterification catalyst, Mn concentration: 100 ppm) were dried at 160° C. to a residual moisture of less than 100 ppm and fed to the extruder for the base layer B.

Alongside this, chips were produced from a linear polyester, which is composed of an amorphous copolyester (Copo I) with 85 mol % of ethylene terephthalate and 15 mol % of ethylene isophthalate (prepared by the transesterification process with Mn as transesterification catalyst, Mn concentration: 100 ppm). The pigmentation of the amorphous copolyester is given in Table 2. The copolyester was dried at a temperature of 100° C. to a residual moisture of less than 100 ppm and fed to the respective extruders for the outer layers A and C.

Coextrusion followed by stepwise orientation in longitudinal and transverse directions was used to produce a transparent three-layer film with ABA structure and with a total thickness of 12 μm. The thickness of the respective layers is seen in Table 2.

Outer layer A was a mixture made from:

86.0% by weight of copolyester (Copo I) with an SV of 800

14.0% by weight of masterbatch made from 99.0% by weight of copolyester (COPO I) (SV of 800) and 0.5% by weight of Sylobloc 44 H (COLLOIDAL SiO₂ from Grace) and 0.5% by weight of Aerosil7 TT 600 (chain SiO₂ from Degussa)

Base layer B 100.0% by weight of polyethylene terephthalate with an SV of 800

The production conditions in the individual steps of the process were:

| Extrusion: | Temperatures | Layer A: | 300° C. |
| | | Layer B: | 300° C. |
| | | Layer C: | 300° C. |
| | Die gap width: | | 2.5 mm |
| | Temperature of take-off roll: | | 30° C. |
| Longitudinal stretching: | Temperature: | | 80–120° C. |
| | Longitudinal stretching ratio: | | 4.2 |
| Transverse stretching: | Temperature: | | 80–135° C. |
| | Transverse stretching ratio: | | 4.0 |
| Heat-setting: | Temperature: | | 230° C. |
| Duration: | | | 3 s |

To improve printability, the film was corona-treated before being wound up. The surface tension of the corona-treated side was 50 mN/m.

The combined-pack film features very good sealing properties with respect to itself, very good optical properties and good processing performance (cf. Table 2).

EXAMPLE 2

A film was produced as in Example 1, except that the sealable layer thicknesses have now been increased from 1 to 1.5 μm. The film features improved sealability with respect to itself.

EXAMPLE 3

A film was prepared as in Example 2, except that the pigment concentrations have now been reduced. The film features improved sealability with respect to itself.

EXAMPLE 4

A film was prepared as in Example 3, except that the concentration of the amorphous copolyester for the outer layers has now been changed. The amorphous copolyester is composed of 80 mol % of ethylene terephthalate and 20 mol % of ethylene isophthalate (Copo II). The film features improved sealability with respect to itself.

EXAMPLE 5

A film was prepared as in Example 1, except that the polymers for the outer layers A and C have now been changed. The film features good sealability and very good optical properties.

Chips made from polyethylene terephthalate and polyethylene 2,6-naphthalate (in a weight ratio of 1:1) (Copo III) were dried at 160° C. to a residual moisture of 50 ppm and fed to the two extruders for the outer layers A and C. The conditions in the extruder for the outer layers A and C are as given in Example 1. The process conditions were as in Example 1.

Base layer B:

95% by weight of polyethylene terephthalate RT 49 from Hoechst AG with an SV of 800

5% by weight of masterbatch made from 99% by weight of polyethylene terephthalate and 1.0% by weight of Sylobloc 44 H which has an average particle size of 4.5 μm Outer layers A and C 50% by weight of Polyclear N 100 polyethylene 2,6-naphthalate prepolymer from Hoechst AG with an SV of 1000

40% by weight of polyethylene terephthalate RT 49 from Hoechst AG with an SV of 800

10% by weight of masterbatch made from 99.0% by weight of polyethylene terephthalate and 1.0% by weight of Sylobloc 44 H which has an average particle size of 1.0 μm

Comparative Example 1

This comparative example corresponds to Example 1 of DE 3 635 928. The sealing properties are unsatisfactory.

TABLE 2

|    | Film thickness μm | Film structure | Layer thicknesses μm | Pigment concen-tration ppm | Sealing initiation temperature °C. | Seal seam strength N/15 mm | Gloss | Haze % | Processing performance |
|----|---|---|---|---|---|---|---|---|---|
| E1  | 12 | ABA | 1/10/1    | 1400/0/1400 | 120 | 1.5 | 140 | 2.8 | very good |
| E2  | 12 | ABA | 1.5/9/1.5 | 1400/0/1400 | 110 | 1.8 | 135 | 2.9 | very good |
| E3  | 12 | ABA | 1.5/9/1.5 | 700/0/700   | 105 | 2.0 | 140 | 2.5 | good |
| E   | 12 | ABA | 1.5/9/1.5 | 700/0/700   | 100 | 2.3 | 136 | 2.7 | good |
| E5  | 12 | ABA | 1/10/1    | 1000/0/1000 | 115 | 1.3 | 180 | 1.9 | good |
| CE1 | 12 | A   | 25        |             | 130 | 0.4 | 125 | 2.0 | satisfactory |

We claim:

1. A multiple-pack system comprising an arrangement of individual packages that are packed in a combined-pack film, wherein the individual packages are packed in polypropylene films, and wherein the combined-pack film comprises a sealable, biaxially stretch-oriented coextruded polyester film having more than one layer with a base layer B and with at least one sealable outer layer A, where the structure of the outer layer is based on copolyesters.

2. The multiple-pack system as claimed in claim 1, wherein the combined-pack film comprises another sealable outer layer C situated on the side of the base layer B that is opposite the sealable outer layer A.

3. The multiple-pack system as claimed in claim 1, wherein the base layer B of the combined-pack film consists essentially of a polyethylene terephthalate homopolymer.

4. The multiple-pack system as claimed in claim 1, wherein at least one sealable outer layer of the combined-pack film comprises a copolymer which comprises ethylene 2,6-naphthalate units and ethylene terephthalate units.

5. The multiple-pack system as claimed in claim 1, wherein at least one sealable outer layer of the combined-pack film comprises a copolymer which comprises ethylene isophthalate units and ethylene terephthalate units.

6. The multiple-pack system as claimed in claim 1, wherein the total thickness of the combined-pack film is 5 to 50 μm.

7. The multiple-pack system as claimed in claim 6, wherein the total thickness of the combined-pack film is 6 to 30 μm.

* * * * *